United States Patent [19]

Frankel et al.

[11] Patent Number: 4,463,443
[45] Date of Patent: Jul. 31, 1984

[54] DATA BUFFER APPARATUS BETWEEN SUBSYSTEMS WHICH OPERATE AT DIFFERING OR VARYING DATA RATES

[75] Inventors: David G. Frankel, Columbia; Michael J. Barrett, Severn, both of Md.

[73] Assignee: The United States of America as represented by the Secretary of the Air Force, Washington, D.C.

[21] Appl. No.: 313,861

[22] Filed: Oct. 22, 1981

Related U.S. Application Data

[63] Continuation-in-part of Ser. No. 60,066, Jul. 24, 1979, abandoned.

[51] Int. Cl.³ .............................................. G06F 3/00
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 2,907,004 | 9/1959 | Chien et al. | 364/900 |
| 3,588,840 | 6/1971 | Nomura et al. | 364/900 |
| 3,761,880 | 9/1973 | Kritz et al. | 364/900 |
| 3,836,891 | 9/1974 | McDaniel | 364/900 |
| 4,056,851 | 11/1977 | Hovagimyan et al. | 364/900 |
| 4,110,564 | 8/1978 | Andresen | 364/900 |
| 4,171,538 | 10/1979 | Sheller | 364/900 |

Primary Examiner—Raulfe B. Zache
Attorney, Agent, or Firm—Donald J. Singer; William Stepanishen

[57] ABSTRACT

A data buffer apparatus to interface subsystem which operate at differing or varying data timing rates utilizing a random access memory unit for data storage. Input data is clocked into an input register synchronously with an input clock. A write/read sequence generator writes the input data from the input register into the random access memory unit. The write/read sequence generator read data out of the random access memory unit into an output holding register. The data from the output holding register is clocked at an output clock rate into the output data register from which the data is transferred out of the data buffer apparatus.

5 Claims, 3 Drawing Figures

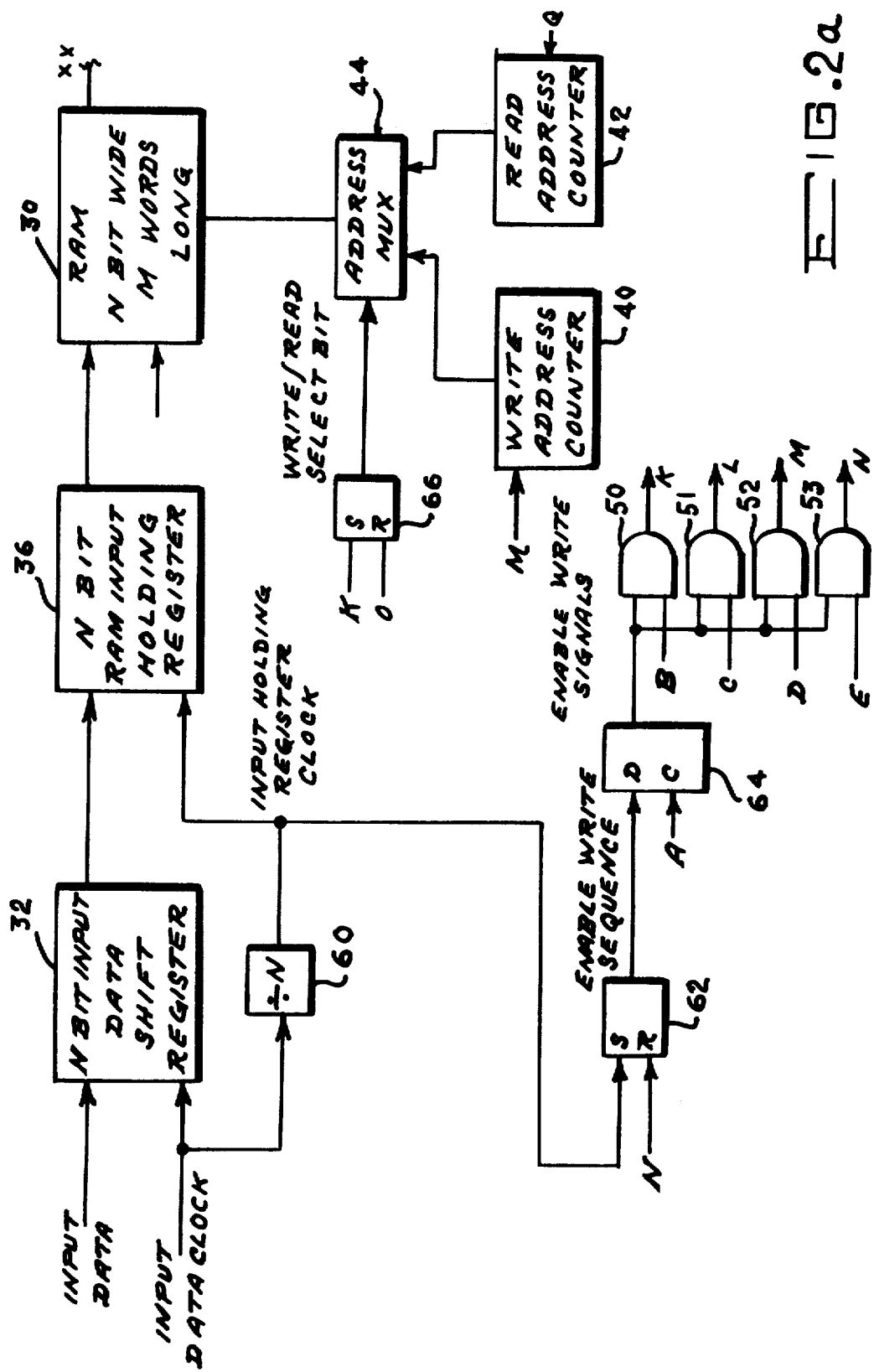

DATA BUFFER APPARATUS BETWEEN SUBSYSTEMS WHICH OPERATE AT DIFFERING OR VARYING DATA RATES

STATEMENT OF GOVERNMENT INTEREST

The invention described herein may be manufactured and used by or for the Government for governmental purposes without the payment of any royalty thereon.

CROSS-REFERENCE TO RELATED APPLICATION

This is a continuation-in-part of co-pending patent application Ser. No. 60,066 filed Jul. 24, 1979, now abandoned.

BACKGROUND OF THE INVENTION

The present invention relates broadly to a data buffer apparatus, and in particular to a fully asynchronous input/output data buffer apparatus.

In the prior art, in any segment of a digital system in which the input and output of information are not synchronous, it is necessary that some provision be made for temporary data storage. While the long term average data rates must be substantially equal through any interface, the short term data rate differences must be handled. For systems in which the input and output rates vary, control of the data storage memory device becomes complicated. A system, for example, in which data is collected from several different sensors and stored on magnetic tape may involve not only nonuniform input data rates, but also an output data format which is not directly compatible with other system requirements.

One conventional solution to the problem is to use First-In-First-Out (FIFO) memory buffers. In a first-in, first-out buffer, the data at the input propagates serially toward the output in a manner not dependent on either the input or output clocks. Even if the input and output rates differ, data will be continuously available at the output. The only requirement is that the input and output rates never differ by so much that the buffer runs completely full or completely empty. Several problems are associated with a typical first-in first-out type buffer. If the required memory becomes large, substantial propagation delays occur between the input and the output. Moreover, these delays are not uniform, but depend on the amount of data stored in the memory. An additional problem is that the first-in, first-out memory is not a common logic element, and its limited availability can severely reduce the choice of logic configurations. Furthermore, the other system requirements such as availability of components from multiple sources, environment, operating speed, etc., may preclude its use entirely. The present apparatus avoids the problems associated with the first-in, first-out memory buffer by using random access memory (RAM) devices for data storage.

SUMMARY OF THE INVENTION

The present invention utilizes a random access memory (RAM) for data storage of data that has clocked into an input register synchronously with an input clock. The data is then transferred to a RAM input holding register, and finally into the RAM. A write-/read sequence generator repetitively produces a series of signals needed to write data into the RAM, read data from it, and to control address counters of the RAM. The data is clocked out of the buffer synchronously with an output data clock. The data is first read out of the RAM into a RAM output holding register and then transferred to an output data register where it is clocked out of the buffer at an output clock rate. The operating frequency of the write/read sequence generator must be high enough that a complete write or read sequence will occur between transfers of data to or from the RAM. The RAM requires enough capacity to store the peak difference between the amount of input and output data.

It is one object of the present invention, therefore, to provide an improved fully asynchronous input/out data buffer apparatus.

It is another object of the invention to provide an improved input/output buffer apparatus wherein the input and output data rates are at different, varying rates.

It is still another object of the invention to provide an improved input/output buffer apparatus wherein the input and output data flows contain discontinuities.

It is yet another object of the invention to provide an improved input/output buffer apparatus wherein the buffer unit utilizes a continuous free running control clock to achieve complete independence of the input and output data timing.

These and other advantages, objects and features of the invention will become more apparent after considering the following description taken in conjunction with the illustrative embodiment in the accompanying drawing.

BRIEF DESCRIPTON OF THE DRAWING

FIG. 1 is a block diagram of the asynchronous input-/output data buffer apparatus in accordance with the present invention, and FIGS. 2a and 2b comprise a complete detailed block diagram of the asynchronous input/output data buffer apparatus.

DESCRIPTION OF THE PREFERRED EMBODIMENT

Figure 1:
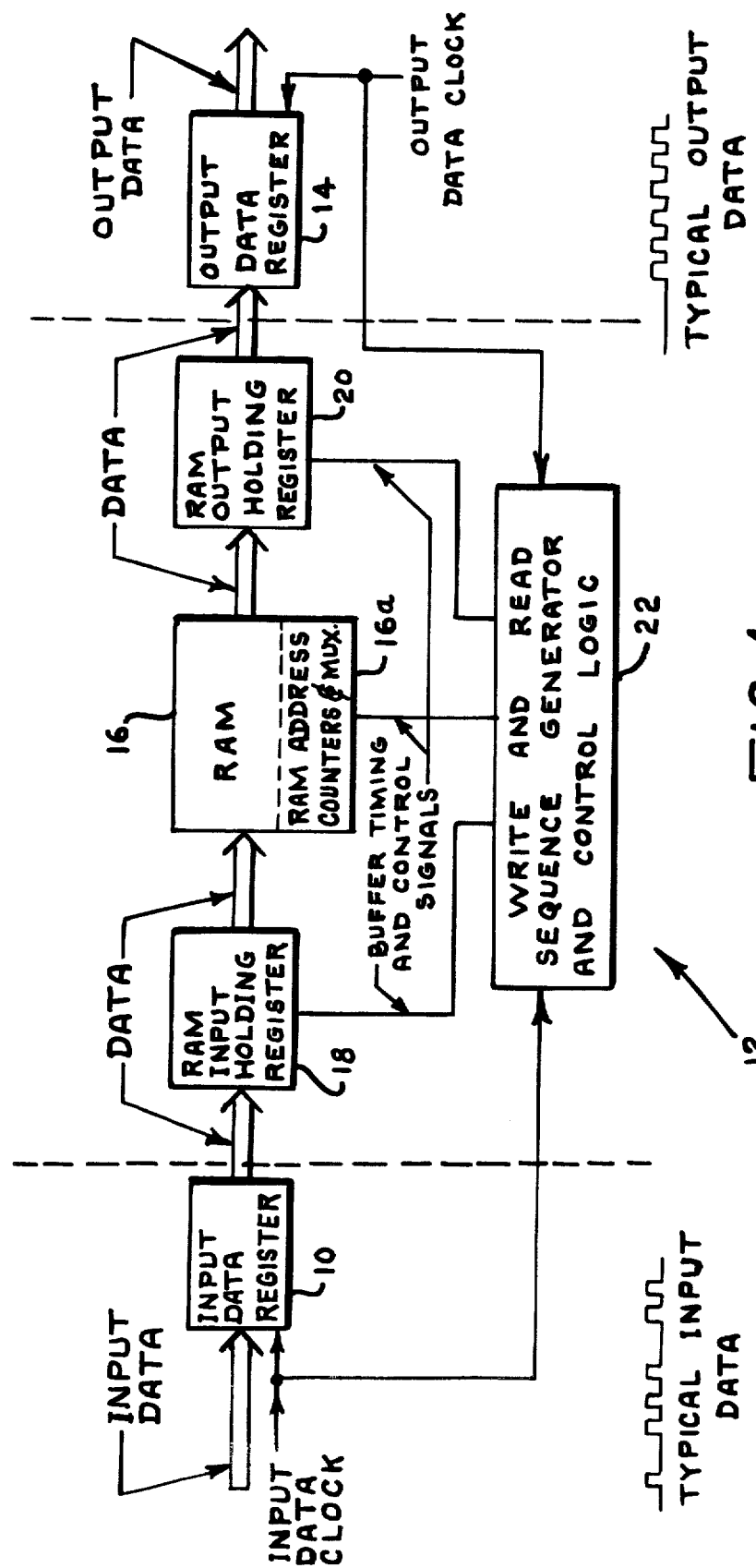

Referring now to FIG. 1, there is shown a fully asynchronous input/output data buffer apparatus comprising an input register 10 wherein the data flow is synchronized to the input clock, the data storage and retrieval means 12 wherein the data is stored and synchronized to the buffer control logic, and the output register 14, wherein the data flow is synchronized to the output clock. In a random access memory, any location in the memory may be accessed at any time for either reading or writing. This characteristic of the random access memory eliminates the problem of propagation delays found in first-in first-out memories since the access time to any data is uniform and relatively short regardless of the memory size. The present apparatus utilizes the random access memory (RAM) with input buffers, output buffers, and a continuous free running control clock to achieve complete independence of the input and output data timing.

The functional circuit elements of the asynchronous input/output data buffer apparatus shown in FIG. 1 includes a data storage and retrieval means 12 which comprise a random access memory 16 (hereinafter referred to as a RAM) for data storage, the holding registers 18, 20 to control data flow, an independent read and write RAM address counters and an address multiplexer 16a, and a write/read sequence generator and control logic unit 22 to control buffer timing. The write/read sequence generator and control logic unit comprise a shift register and the logic gates to permit the input and output data clocks to respectively write into and read from the random access memory unit 16. The shift register portion of the write/read sequence generator and logic control unit 22 which operates with a high speed clock, continuously circulates a single logical one within itself. The write/read sequence generator and control unit 22 utilizes commercially available counters, flip-flops, Nand gates, inverters, data registers and shift registers in a standard conventional manner to generate write or read signals compatible with varying or equal input and output data clock rates. The 4000 series CMOS circuits which are available from either RCA, National Semiconductor or Motorola, utilize the following component part numbers:

CD4017—counter
CD4013—flip-flop
CD4011—Nand gates
CD4025—Nand gates
CD4049—inverter
CD4029—data register
DC4014—shift register The write/read sequence generator and control logic unit 22 is also commercially available in TTL logic from either Fairchild, Signetics Texas Instruments under the following component part numbers:

54192—counter
5474—flip/flop
5400—Nand gate
5404—inverter
54195—data/shift register.

In the TTL logic these components are available to either standard or low power Shotsky depending upon a particular speed of operation. The component devices are also available in ECL logic from either Fairchild or Motorola under the following part numbers:

10136—counter
10131—flip/flop
10501—Nand gate/inverter
10541—data/shift register.

The write/read sequence generator 22 repetitively produces the series of signals needed to write into the RAM 16 or read from it, and to control the address counters 16a. These signals are asynchronous with the buffer input and output clock rates. Although the signals are generated continuously, they are enabled and disabled in response to the data input and data output clocks. It is this signal gating which enables the buffer to coordinate the data flow through the circuit. The data enters the buffer at the input data register 10 synchronously with the input data clock and is transferred to the RAM input register 18 when the input data register 10 is full. The transfer enables the next sequence of RAM write signals from the write/read sequence generator 22, thus entering the data into the next available RAM address. During this time, the input data register 10 continues to collect new data. In a similar manner, the data is output from the buffer at the output data register 14 synchronously with the output data clock. When the output data register 14 is empty, data in the RAM output register 20 is transferred to it. The transfer enables the next sequence of RAM read signals from the read/write sequence generator 22, thus entering new data from the next address in the RAM into the RAM output register 20. During this time, the data continues to be available in the data output register 14. It may be noted that although no relationship is assumed between the buffer input and output timing, there are two basic requirements. One requirement is that the operating frequency of the write/read sequence generator 22 be high enough to assure that a complete write or read sequence will occur between the required transfers of data to or from the RAM 16. The second is that the memory of the RAM be large enough to store the peak difference between the amount of data input and the amount of data output.

Figure 2B:
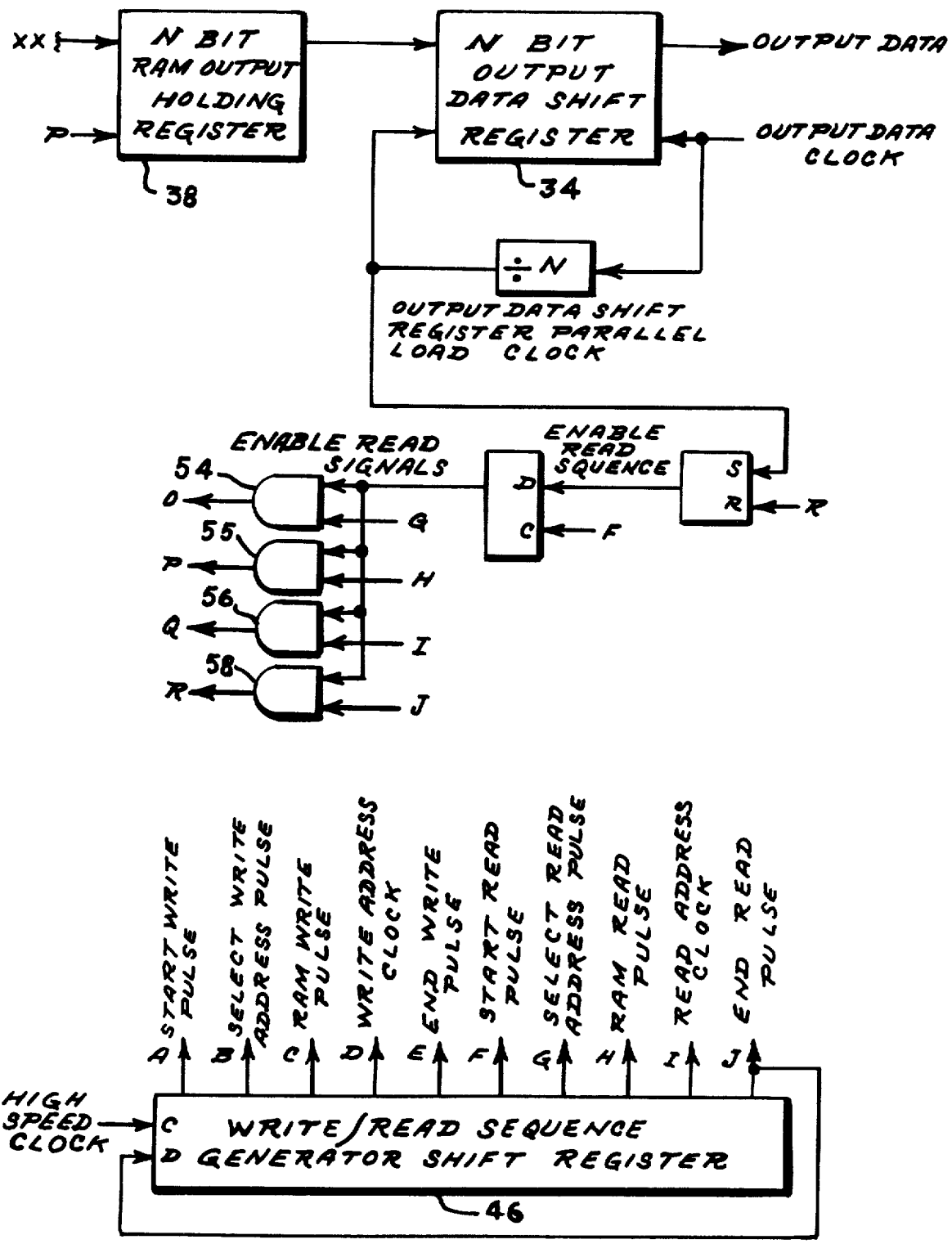

Turning now to FIGS. 2a and 2b, there is shown a block diagram of the functional circuit elements which comprise the input/output buffer apparatus. The input/output buffer apparatus comprises the following components, a random access memory (RAM) 30 for data storage, an input register 32, an output register 34, a pair of holding registers 36, 38 to control data flow, independent write and read RAM address counters 40, 42, an address multiplexer 44, a write/read sequence generator 46 and logic gates 50-58 to control buffer timing. The write/read sequence generator 46 repetitively produces the series of signals needed to write into or read from the RAM 30, and to control the address counters 40, 42. The sequence generator 46 is a shift register which continuously circulates a single logical one through its outputs A-J. This series of pulses is used in the conventional manner to write into or read from the RAM 30. These signals A-J are asynchronous with the buffer input and output data rates. Although the signals A-J are generated continuously, they are enabled and disabled in response to the data input and data output clocks. It is this signal gating which enables the buffer apparatus to coordinate the data flow through the circuit. The data enters the buffer apparatus at the input data register 32 synchronously with the input data block and is transferred to the RAM input holding register 36 when the input data register 32 is full. The full state of the register 32 is detected by the divide by N counter 60 which will output a pulse after every N input clocks, N being a positive integer greater than one. The output pulse from the divide by N counter 60 enables the next sequence of RAM write signals A-E from the write/read sequence gnerator 46 by setting flip-flop 62 thus entering the data into the next available RAM address. During this time, the input data register 32 continues to collect new data.

The write sequence is as follows. The start write pulse A clocks the output of flip-flop 64 to the AND gates 50-53. This enables write sequence pulses B-E through the AND gates 50-53 to consecutively select the write address by setting flip-flop 66 which controls address multiplexer 44 to strobe data into RAM 30 and to increment the write address counter 40 to the next address, and to reset flip-flop 62 to end the sequence.

In an analogous manner, data is output from the buffer appartus at the output data register 34 synchronously with the output data clock. When the output data register 34 is empty, the data in the RAM output holding register 38 is transferred to the output data register 34. The transfer enables the next sequence of RAM read signals from the read/write sequence generator 46, thus entering the new data from the next address in the RAM 30 into the RAM output holding register 38. During this time, the data continues to be available in the data output register 34. Note that although no relationship is assumed between the buffer input and output timing, there are two basic requirements. One requirement is that the operating frequency of the write read sequence generator 46 be high enough to assure that a complete write or read sequence will occur between the required transfers of data to or from the RAM 30. The second is that the memory be large enough to store the peak difference between the amount of data input and the amount of data output. The RAM 30 is shown as being M words long, each word having N bits and therefore MxN bits can be stored.

Circuits using the principles described above may have wide ranging application in the many data processing fields, one of which use is on a spacecraft system. A brief description of such a typical application is as follows:

In a first application, the blocks of data are collected from sensors which are operated at non-uniform rates. Later data processing requires data flow at a constant rate. A buffer may be designed to accept input data at a rate which can be either faster or slower than the output rate. From a system analysis, it may be determined that variations in the input data rate which are sufficient to produce up to N bits more than the output data rate, or N bits less than the output data rate which would be outputted at the constant output rate. To handle this situation, the buffer RAM can be designed to store slightly more than 2N bits, and the initial output from the buffer may be delayed until the RAM was just half full. Thus, at a worst case if the input data rate produced N bits more than the output data rate to be outputted, the RAM would never be quite full. Likewise, at the worst case, when input data rate producing N bits less than the output data rate to be outputted, the RAM would never be quite empty. This situation assures continuous data availability at the output.

In a second application, the data is to be transferred to a tape recorder. The recorder format generally requires that a gap of N bits be inserted into the data periodically, but the data to be recorded is continuous. The system requires a buffer which is able to store the N bits of data which occur while the gap is inserted. It also must be able to accommodate an output rate which is just enough faster than the input rate so that time lost for data transfer during one gap is just made up before the next gap. The present buffer apparatus is well suited to be adapted to this situation as the previous one.

Although the invention has been described with reference to a particular embodiment, it will be understood to those skilled in the art that the invention is capable of a variety of alternative embodiments within the spirit and scope of the appended claims.

What is claimed is:

1. An asynchronous input/output data buffer apparatus comprising in combination:
    an input data register to receive input data synchronously with a first clock rate, said input data register having the capability to store N data bits, where N is a positive integer greater than one, said input data register providing a first pulse signal when the register is full,
    a write/read sequence generator producing a series of write and read signals, said write/read sequence generator receiving a high speed clock signal, said write/read sequence generator continuously circulating a single logical one within itself, said write/read sequence generator receiving said first pulse signal and generating a write signal in response thereto, said write/read sequence generator receiving a second pulse signal and generating a read signal in response thereto,
    a data storage and retrieval means to receive said input data from said input data register upon receipt of said write signal from said write/read sequence generator, said data storage and retrieval means receiving said input data at said first clock rate, said data storage and retrieval means holding said input data, said data storage and retrieval means having a storage capacity of 2N data bits, said data storage and retrieval means generating a continuous free-running control clock, said input data being transferred within said data storage and retrieval means in synchronism with said free-running control clock, said data storage and retrieval means providing a data output upon receipt of said read signal from said write/read sequence generator, and,
    an output data register connected to said data storage and retrieval means to receive said data output, said output data register providing said second pulse signal when the register is empty, said output data register receiving said data output at a second clock rate, said output data register providing output data at said second clock rate whereby input data at a first clock rate from a first subsystem is transferred to a second subsystem as output data at a second clock rate, said first subsystem operating at said first clock rate, said second subsystem operating at said second clock rate.

2. An asynchronous input/output data buffer apparatus as described in claim 1 wherein said data storage and retrieval means comprises in combination:
    a RAM input holding register to receive said input data from said input data register upon receipt of said first pulse signal,
    a random access memory unit connected to said RAM input holding register to receive and store said input data therefrom upon receipt of said write signal, said random access memory unit having a storage capacity of 2N data bits,
    a RAM output holding register connected to said random access memory unit to receive data bits therefrom upon receipt of said read signal, said RAM output holding register providing said data bits as output data, and,
    a control generator receiving said first and second data clock rates, said control generator providing said continuous free-running control clock to said RAM input holding register, said random access memory unit, and said RAM output holding register, said control generator providing read/write sequence signals to said RAM input holding register, said random access memory unit and said RAM output holding register.

3. An asynchronous input/output data buffer apparatus as described in claim 1 wherein said first clock rate is greater than said second clock rate.

4. An asynchronous input/output data buffer apparatus as described in claim 1 wherein said first clock rate is less than said second clock rate.

5. An asynchronous input/output data buffer apparatus as described in claim 1 wherein said first clock rate and said second clock are operating at varying clock rates.

* * * * *